(12) United States Patent
Boros

(10) Patent No.: US 7,440,751 B2
(45) Date of Patent: Oct. 21, 2008

(54) SYSTEM AND METHOD FOR CONTROLLING ENERGY USAGE IN MOBILE APPLICATIONS

(75) Inventor: Andras Boros, Budapest (HU)

(73) Assignee: Nokia Corporation, Espoo (FI)

(*) Notice: Subject to any disclaimer, the term of this patent is extended or adjusted under 35 U.S.C. 154(b) by 455 days.

(21) Appl. No.: 11/173,701

(22) Filed: Jun. 30, 2005

(65) Prior Publication Data

US 2007/0004468 A1    Jan. 4, 2007

(51) Int. Cl.
 H04M 3/00  (2006.01)
 H04Q 7/20  (2006.01)

(52) U.S. Cl. .................. 455/418; 455/405; 455/425

(58) Field of Classification Search .......... 455/414.1, 455/418, 574, 572, 405, 425, 423
See application file for complete search history.

(56) References Cited

U.S. PATENT DOCUMENTS

| | | | |
|---|---|---|---|
| 6,263,200 B1* | 7/2001 | Fujimoto | 455/343.5 |
| 6,275,712 B1* | 8/2001 | Gray et al. | 455/522 |
| 7,242,971 B2* | 7/2007 | Park | 455/574 |
| 2005/0003824 A1* | 1/2005 | Siris | 455/452.1 |
| 2005/0066208 A1* | 3/2005 | Koie et al. | 713/320 |
| 2006/0183480 A1* | 8/2006 | Kato et al. | 455/436 |
| 2007/0010268 A1* | 1/2007 | Kim et al. | 455/509 |
| 2007/0254628 A1* | 11/2007 | Rybak | 455/405 |

OTHER PUBLICATIONS

Alta: The Nested Process Model In Java, www.cs.utah.edu, Jul. 13, 2005, pp. 1-3.
JKernel & JServer, www.cs.cornell.edu, Jul. 13, 2005, 1 pg.
Nomads: A Java Based Mobile Agent System, Institute for Human and Machine Cognition (IHMC), www.ihmc.us, Jul. 13, 2005, 1 pg.
JSeal 2, www.jseal2.com, Jul. 13, 2005, 2 pgs.
The Janos Project, www.cs.utah.edu, Jul. 13, 2005, pp. 1-2.
Luna: a Flexible Java Protection System, Chris Hawblitzel and Thorsten Von Eicken, www.cs.dartmouth.edu, Jul. 13, 2005, pp. 1-16.
Isolation, Resource Management And Sharing In The Kaffeos Java Runtime System, Godmar Back, The University of Utah, May 2002, pp. 1-163.

* cited by examiner

*Primary Examiner*—Sonny Trinh
(74) *Attorney, Agent, or Firm*—Foley & Lardner LLP

(57) ABSTRACT

A system and method for controlling resource usage in an electronic device. An energy resource manager is used to monitor the energy usage by operations of an application or other software entity. When a new operation is to begin for the application, it is determined whether the energy cost for active operations for that application exceeds a predetermined energy cost quota. If the energy cost of the active operations does not exceed the quota, then the operation is allowed to proceed. If the energy cost of the active operations exceeds the quota, the operation is not permitted to proceed.

26 Claims, 4 Drawing Sheets

SYSTEM AND METHOD FOR CONTROLLING ENERGY USAGE IN MOBILE APPLICATIONS

FIELD OF THE INVENTION

The present invention relates generally to resource management of software applications in mobile devices. More particularly, the present invention relates to the management of energy resources and other resources in mobile devices.

BACKGROUND OF THE INVENTION

Energy management is a key problem area for mobile terminals. The battery lifetime is a distinguishing feature of the mobile phone and is a very important aspect that affects a mobile telephone's usability. As long as mobile telephones were constructed using proprietary software platforms that were inaccessible to third party developers, the manufacturers had a great deal of control over the energy usage patterns of their own internally developed applications. However, this situation has changed greatly in recent years. New widely-adopted software platforms such as the Symbian operating system and Java-based runtime environments have been created, and third party developers can now deploy their applications to mobile telephones. As a result, manufacturers can no longer test, in advance, each application that is run on their mobile telephones. Consequently, the danger of malicious or faulty applications being run on mobile telephone is greater than ever. To address this threat, manufacturers must enhance their mobile software platforms to protect key hardware resources in general, battery lifetime in particular.

An example of a current mobile software platform is OSGi. OSGi, which stands for "Open Services Gateway Initiative" and is discussed at www.osgi.org, is an open, common architecture to deploy and manage services in a coordinated manner. OSGi provides a general-purpose, secure, managed Java-based framework that supports the deployment of extensible and downloadable service applications known as bundles. OSGi-compliant devices can download and install OSGi deployment entities and remove them when they are no longer required. Installed and started bundles can register a number of services that can be shared with other bundles under strict control of the framework.

OSGi can run on the top of a standard Java Virtual Machine (VM). Contrary to conventional methods where one Java application runs on one VM, several bundles can be run simultaneously on the same VM in OSGi. OSGi as a multi-application platform assumes a mostly cooperative environment, where the installed applications behave according to the rules/guidance described in the OSGi specification. Although this assumption may hold true in a closed environment where all installed applications come from a trusted source, it may not be true if the platform may run any application, even those whose source is not trusted.

OSGi currently does not mandate a resource management solution. Consequently, applications are not separated or controlled as far as resource usage is concerned. "Resource" refers to both physical resources, such as processor time, primary and secondary storage, network bandwidth, battery energy, etc., and logical resources, such as databases, various UI components, etc. in OSGi systems. If the application resource usage is not controlled, the platform is open to Denial of Service-type attacks. In such circumstances faulty and malicious applications exploiting the lack of resource management directly endanger the robustness, reliability, and usability of the platform.

With plans to deploy the OSGi platform to mobile phones, the issue of energy management becomes much more complex. With no resource management system in place and no limitations on the energy usage of OSGi applications, ill-behaving applications may simply drain the battery power by repeatedly performing energy-intensive operations. For example, such applications could control the display backlight, play tones, perform network communications, etc., rendering the phone virtually unusable by dramatically shortening the battery lifetime.

SUMMARY OF THE INVENTION

The present invention provides for a system and method for monitoring and limiting—if necessary—the energy usage of applications and/or other software entities running on a mobile telephone. These applications or other software entities may be of various types, such as OSGi or OSGi mobile expert group (MEG) applications.

According to the present invention, the system demands a central entity, the energy resource manager or ERM, to be set up as part of the underlying platform to monitor and limit (if needed) the energy usage of each running application. Each application receives an energy cost quota representing the maximum amount of energy that it can use over a given period of time. This time period is referred to as the quota measurement period.

The ERM monitors only the energy-intensive application operations. Each energy-intensive operation that an application may perform is described with an energy cost function. The energy cost function describes the energy cost of that operation over a given period of time, although not necessarily in absolute terms; the functions should produce meaningful values in comparative terms. An application may have more than one operation running in parallel. Therefore, an application's energy consumption is the cumulative value of the energy cost generated by each operation running in the given period of time.

The ERM regularly recalculates an application's energy usage over the quota measurement period with the help of the cost functions. If the application has consumed the prescribed maximum amount of energy (i.e., exceeded its quota), the ERM enforces limitations on further application activities. The potential limitations range from hard limitations, such as shutting down the application altogether, to more soft counter measures, including taking no action whatsoever. The energy usage calculation restarts at the beginning of each quota measurement period by zeroing each application's energy usage calculated up to that point.

The telephone manufacturer and/or other vendors developing system software for the mobile telephone identifies the energy-intensive operations accessible to applications and describes them with appropriate energy-cost functions. The manufacturer also provides the policy system to assign each application an energy cost quota. The manufacturer implements the ERM and determines the set of corrective actions the ERM may take against applications having exhausted their quota. The set of actions and the conditions governing the execution of those actions may be automatic or user-driven.

The present invention includes a number of significant benefits. As discussed above, a device incorporating the present invention can greatly extend its battery life before having to recharge the battery. The recent invention also hinders poorly-behaving applications from severely draining the device's battery. The present invention can be applied to virtually any multi-application Java platform, as well as to native multi-application environments, such as Symbian environments.

These and other objects, advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

Figure 1:
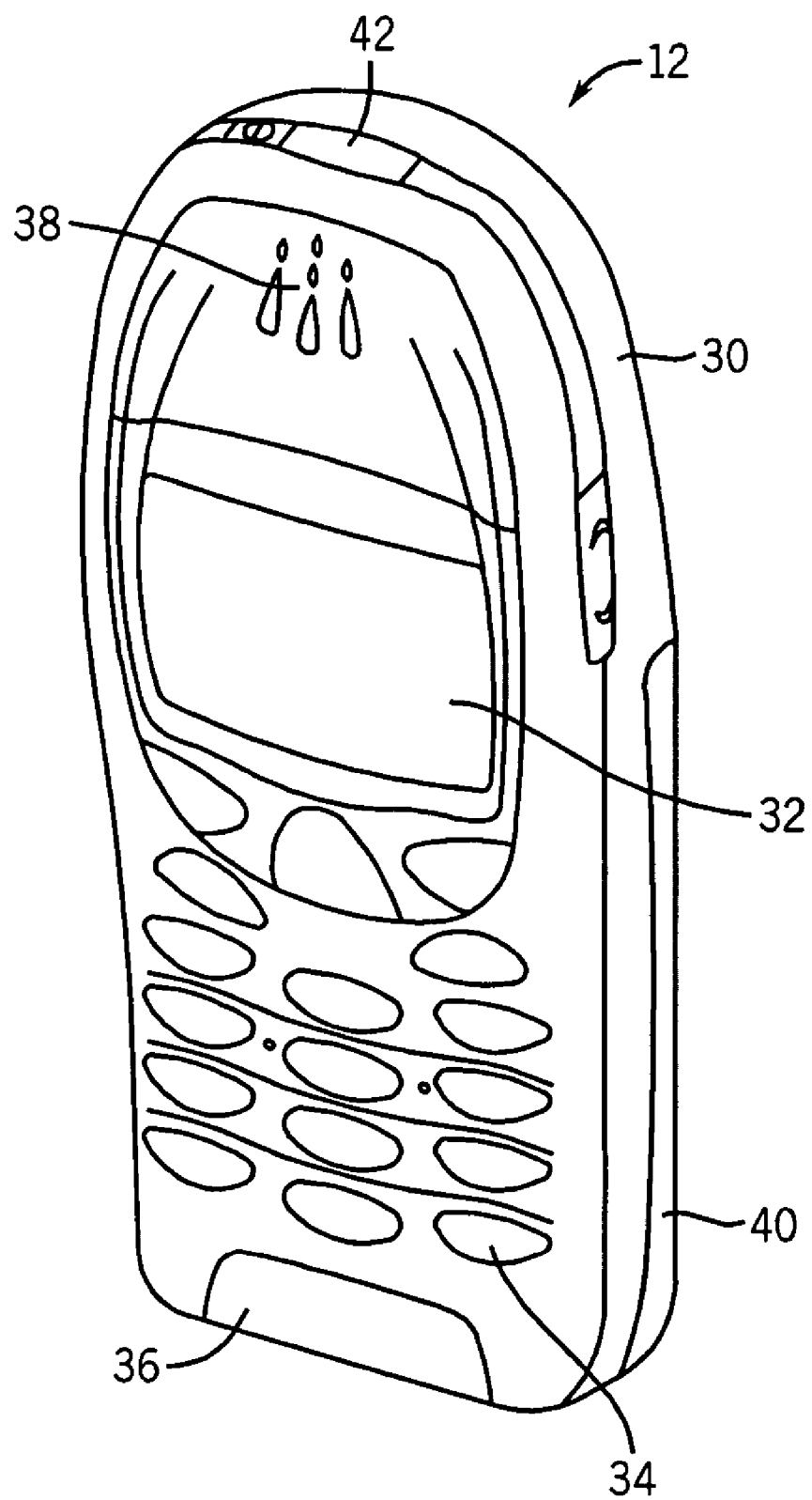
FIG. 1 is a perspective view of a mobile telephone that can be used in the implementation of the present invention.
Figure 2:
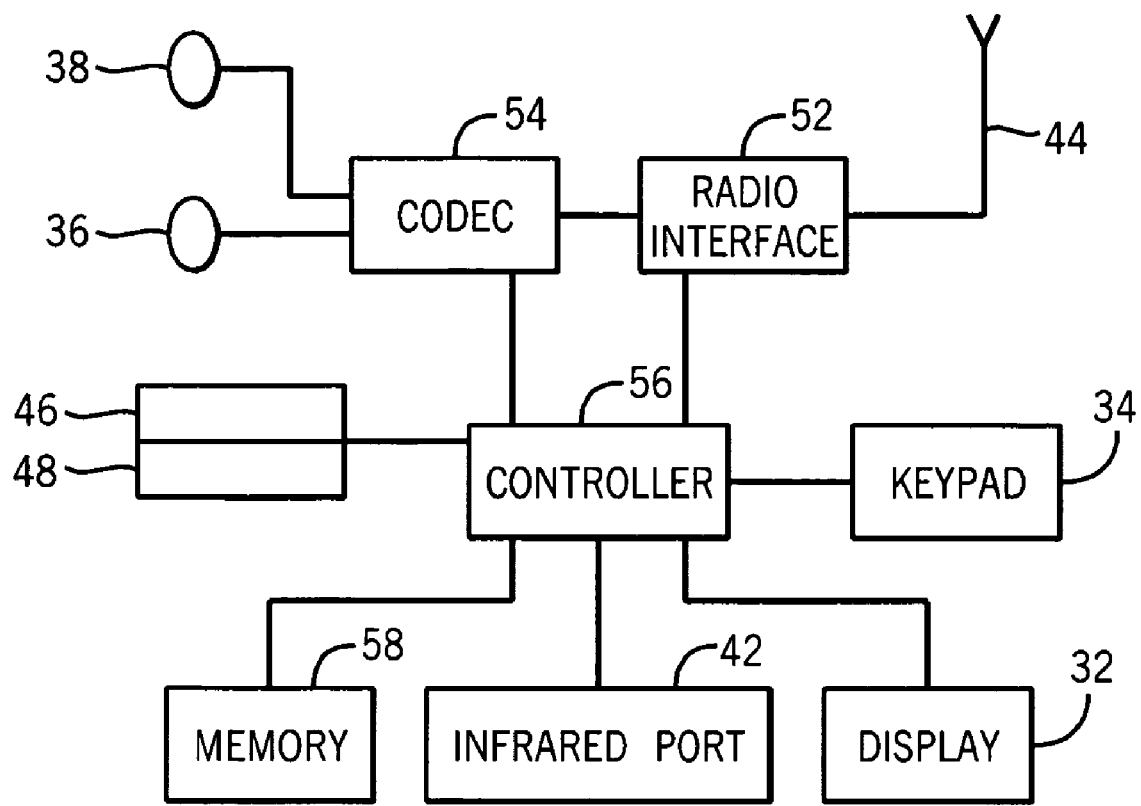
FIG. 2 is a schematic representation of the telephone circuitry of the mobile telephone of FIG. 2.

FIGS. 1 and 2 show one representative mobile telephone 12 within which the present invention may be implemented. It should be understood, however, that the present invention can be implemented into a wide variety of electronic devices, including personal computers, personal digital assistants, integrated messaging devices, and other electronic devices where a Java VM and an OSGi implementation is or may be available. The mobile telephone 12 of FIGS. 1 and 2 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

The present invention provides for a system and method for monitoring and, if necessary, limiting the energy usage of applications and/or other software entities running on a mobile telephone. These applications or other software entities can be of various types and comprise, for example, OSGi and OSGi MEG applications. Although applications are specifically mentioned herein, it should be noted that the present invention can be used in conjunction with a wide variety of software entities and is not strictly limited to applications. The present invention serves to protect the battery life of a mobile device from malicious or poorly-behaving applications that willingly or unwillingly create Denial of Service (DoS) attacks against the mobile telephone.

The present invention introduces the following key concepts: the energy cost account and the energy cost functions, the energy cost quota and the quota measurement period, the energy resource manager, and the corrective actions or counter measures. These concepts are discussed in detail herein.

According to the principles of the present invention, each energy-intensive operation that an application may perform must be described with an energy cost function. The energy cost function describes the energy cost of that operation over a given period of time. Although the energy cost function need not exactly correspond to the amount of energy being expended via the operation, the relative energy cost functions should generally relate to the level of energy used in different operations in one embodiment of the invention, i.e., an operation that requires a great deal of energy should have a higher energy cost function than an operation that requires minimal energy. An application may have more than one operation running in parallel. Therefore, an application's energy consumption is calculated to be the cumulative value of the energy cost generated by each operation running for the application in a given period of time.

Each application that is installed on the platform receives an energy cost quota. The energy cost quota represents the maximum amount of energy that the application can use over the quota measurement period. The quota measurement period is the time period in which the application's energy usage is calculated and summarized. The energy usage calculations are restarted at the beginning of each quota measurement period.

The system requires a central entity—the energy resource manager or ERM—as part of the underlying platform to monitor and, if necessary, to limit the energy usage of each running application. The ERM recalculates an application's energy usage regularly, since the beginning of the quota measurement period. The recalculation occurs (i) whenever the application would like to perform a new energy-intensive operation or (ii) upon the termination of an existing energy-intensive operation or (iii) if the application does not start a new operation or complete an existing operation, after a regular time interval. The ERM uses these calculated figures to maintain an energy cost account for each application. The energy cost account holds the cumulative energy consumption generated in the quota measurement period by each monitored application. The account is updated with the figures received from the cost functions.

If the application has consumed the prescribed maximum amount of energy (i.e., exceeded its quota), the ERM enforces limitations on further application activities. The potential limitations range from hard measure to more soft measures. Hard counter measures would typically deny the execution of further operations or shut down the application altogether. Soft measures would typically result in user notifications or no action whatsoever. The energy usage calculation restarts at the beginning of each quota measurement period by zeroing each application's energy usage calculated up to that point.

A use case from a manufacturer's point of view is generally as follows: The manufacturer creates a set of energy-intensive operations that would like to have usage priority in the device at issue. The manufacturer profiles this set of operations in terms of creating the function that describes the energy cost of performing these operations. The manufacturer therefore creates several policies and offers the possibility of choice to the user. Among the created policies, the manufacturer can create an "energy safe" policy that ensures that third party applications will receive low energy cost quotas once the battery energy level drops to a certain percentage, thereby prolonging the battery lifetime.

From a malicious or otherwise ill-behaving application's point of view, the application will proceed to initiate a number of energy-intensive operations to drain the battery power. When the application starts a new operation, the system will deny the execution of the operation by throwing an exception.

From the user's point of view, the user can download and install a new application. In a situation where the user would like to prolong the battery lifetime as long as possible, the user can set the "energy safe" mode policy. Once the battery energy level drops to the set level, a ill-behaving application will change its behavior, but the remainder of the device applications will be permitted to remain fully functional for the desired period.

The following text describes the implementation details and various embodiments of the present invention. An energy cost function expresses the cost in terms of energy used for performing a particular operation over a given period of time. These operations can be performed by the application either explicitly or implicitly. The explicit case covers operations where an application uses an application program interface (API) to access a particular energy-intensive functionality provided by the platform. Examples include the use of the display, Bluetooth connections, infrared connections, etc. The implicit case covers operations that are usually performed by the platform running the application, and the problem is caused by malicious or faulty application behavior patterns. Such examples in the case of Java platforms include Java applications' abuse of thread scheduling and garbage collection.

The creation of the energy cost function is the responsibility of the manufacturer and/or other software vendors creating mobile telephone system software in one embodiment of the present invention. First, the energy-intensive operations must be selected. i.e., those operations whose uncontrolled and repeated execution poses a threat to battery life. In one embodiment of the present invention, It system APIs in a mobile software platform that perform functions that may be energy-intensive and that are accessible to third party applications will all be inspected. Each of these operations is then characterized with an energy cost function. The energy cost function does not necessarily need to be the concrete amount of energy used. Instead, the energy cost function need only be correct in relative terms when compared to other cost functions. For example, keeping the display backlight of a mobile telephone on for a period of time may be more expensive than running a thread over the same period of time.

The initial energy cost quotas express the maximum amount of energy cost an application is allowed to generate in a quota measurement period, and it is enforced by the ERM throughout that period. The quota of the application is always compared to the current status of the energy cost account that belongs to the same application. In other words, the ERM checks whether the current sum of energy cost generated reached the quota. If it did reach the quota, corrective action is taken.

The energy cost quotas are assigned to the application's installation time based on a policy system created by the manufacturer and/or other trusted vendors. In one embodiment of the invention, the policy system matches the level of trust the device has in the downloaded application with an energy cost quota. Applications with different levels of trust are expected to receive different cost quotas, with applications trusted to a lesser extent receiving smaller quotas. The trust level is established using Java code signing and authentication mechanisms introduced since Java version 1.1. The creation of quotas and policies are again the responsibility of the manufacturer or other trusted vendors in one embodiment of the invention.

The energy conservation policies discussed herein can be activated for a variety of reasons. For example, the manufacturer may decide that the policy is only enforced if the battery energy level drops below a certain level. The manufacturer may also decide to make this choice explicitly user-driven, where the user is provided with the ability to decide when to activate the policy.

The ERM is a central entity implemented by the underlying platform that owns and enforces the energy management policies. Key ERM activities include the monitoring of the energy usage of the applications executed on the platform and enforcing the energy cost quotas, if necessary. For monitoring the application's energy usage, the ERM maintains an energy cost account for each application. The energy cost account holds the sum of the energy costs the application has generated thus far in the actual quota measurement period.

The ERM is event-driven and expects to be notified about an application starting or completing an energy-intensive operation. Based upon these notifications, the ERM will recalculate the costs in the cost account for each monitored application. Consequently, the ERM must be able to identify the source application of the notification. However, it might also happen that an operation takes a long time to complete. Therefore, since the ERM does not receive any events until the operation is completed, the ERM will not be able to update the cost account in this situation. To avoid this situation, in one embodiment of the invention, the ERM uses a watchdog timer (per application) to update the cost account. The ERM restarts the watchdog timer if it is notified about the application completing an operation or starting a new operation.

The cost account needs to be updated with the amount of cost that was generated in the time elapsed from the previous update. The ERM accomplishes this activity by looking at the application operations running at that point in time and summing their individual costs generated in the examined time period. The ERM obtains the costs by invoking the cost functions for each running operation and then updates the cost account by adding the calculated cost to the existing balance.

In order to establish which operations are currently running, the ERM maintains an operation registry. The operations included in the registry are registered whenever a new "operation start" notification is received and the operation is allowed to proceed. Operations are unregistered whenever an "operation completed" notification is received by the ERM.

The energy cost account is maintained for the duration of the quota measurement period. Once the quota measurement period is over, the cost account of each application is zeroed, and a new quota measurement period begins.

Whenever the energy cost account is updated for an application, the ERM needs to check whether the application has reached its quota for the current quota measurement period. If the application has reached its quota for the current quota measurement period, the ERM must take corrective action in the future against the application. The potential actions range from hard to relatively soft counter measures. In one embodiment of the invention, the ERM denies the execution of the application as a corrective action by effectively shutting the application down immediately. A softer countermeasure can comprise denying the start of any new operations for the application until the end of the quota measurement period and optionally suspending some or all of its running operations as well. An even more permissive counter measure involves postponing actions until a subsequent quota measurement period. This can be optionally accompanied by assigning a smaller quota to the misbehaving application. It is the responsibility of the manufacturer and/or other trusted vendors to determine the exact timing and the nature of the corrective action, as the present invention allows for a wide variety of combinations.

In one embodiment of the present invention, the process of taking counter measures is made interactive either towards the application, towards the user of the mobile telephone, or towards both entities. In this embodiment, the application is notified about ERM decisions affecting the execution of existing or new operations. For example, in Java-based platforms, this can be accomplished by the ERM raising an exception towards the application. The user may be provided the opportunity to confirm or override some of the ERM decisions. For example, the user may be asked whether it confirms the ERM's decision to terminate an ill-behaving application. In another example, the user may manually increase the quota for an application or manually select the set of operations to be shut down. In a further implementation, the ERM simply notifies the user about ERM decisions, without granting any opportunities to confirm or override the decisions.

Figure 3:
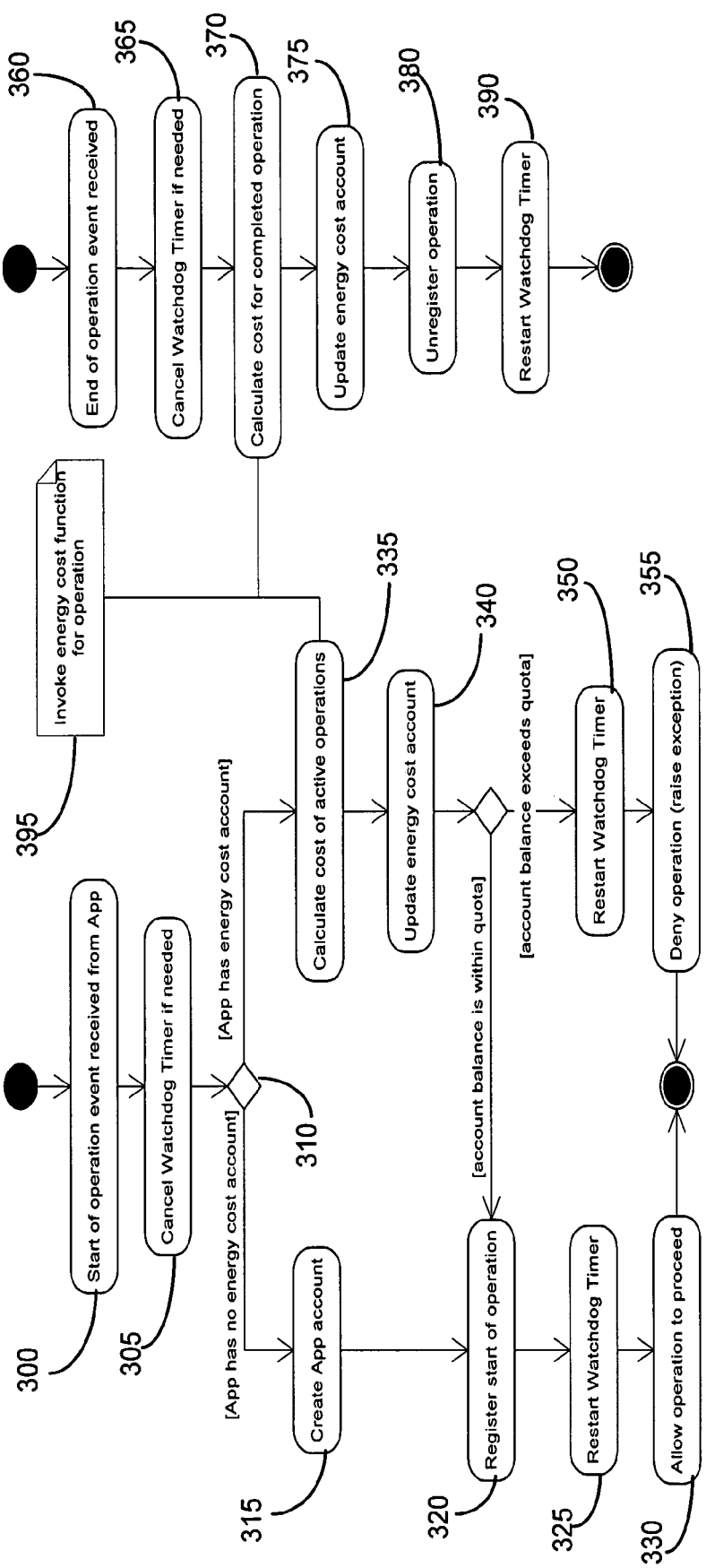
FIG. 3 is a flow chart showing the activity of an energy resource manager in the event that it receives an "operation start" or "operation completed" notification.

FIG. 3 is a flow chart showing the activity of the ERM in the event that it receives an "operation start" or "operation completed" notification. In this embodiment of the invention and at step 300 in FIG. 3, the ERM is notified that an application has initiated an operation event. At step 305, the watchdog timer is stopped if necessary. At step 310, it is determined whether the application at issue already possesses an energy cost account. If there is no energy cost account, then an energy cost account is created at step 315. At step 320, the initiation of operation is registered. At step 325, the watchdog timer is reset and, at step 330, the operation is allowed to proceed.

If the application at issue already has an energy cost account, then the energy cost of the active operation is calculated at step 335. The energy cost function is invoked for this purpose at step 395. At step 340, the energy cost account is updated, taking into account the energy cost of the active operations initiated since the initiation of the current quota period. It is then determined whether the energy cost account's balance is still within the quota at step 345. If the energy cost account's balance is within the quota, then the initiation of the operation is registered with the ERM at step 320, the watchdog timer is restarted at step 325, and the operation is allowed to proceed at step 330. If, on the other hand, the energy cost account already exceeds the quota, then at step 350, the watchdog timer is reset and, at step 355, as a corrective action, the execution of the operation is denied, for example by raising an exception.

At step 360, an "end of operation" event for an application is received by the energy resource manager. At step 365, the watchdog timer is canceled if necessary. The energy cost for the active operations is calculated at step 370, taking into account the invoked energy cost function. At step 375, the energy cost account is updated to reflect the active operations. The operation is unregistered at step 380, and the watchdog timer is restarted at step 390.

Figure 4:
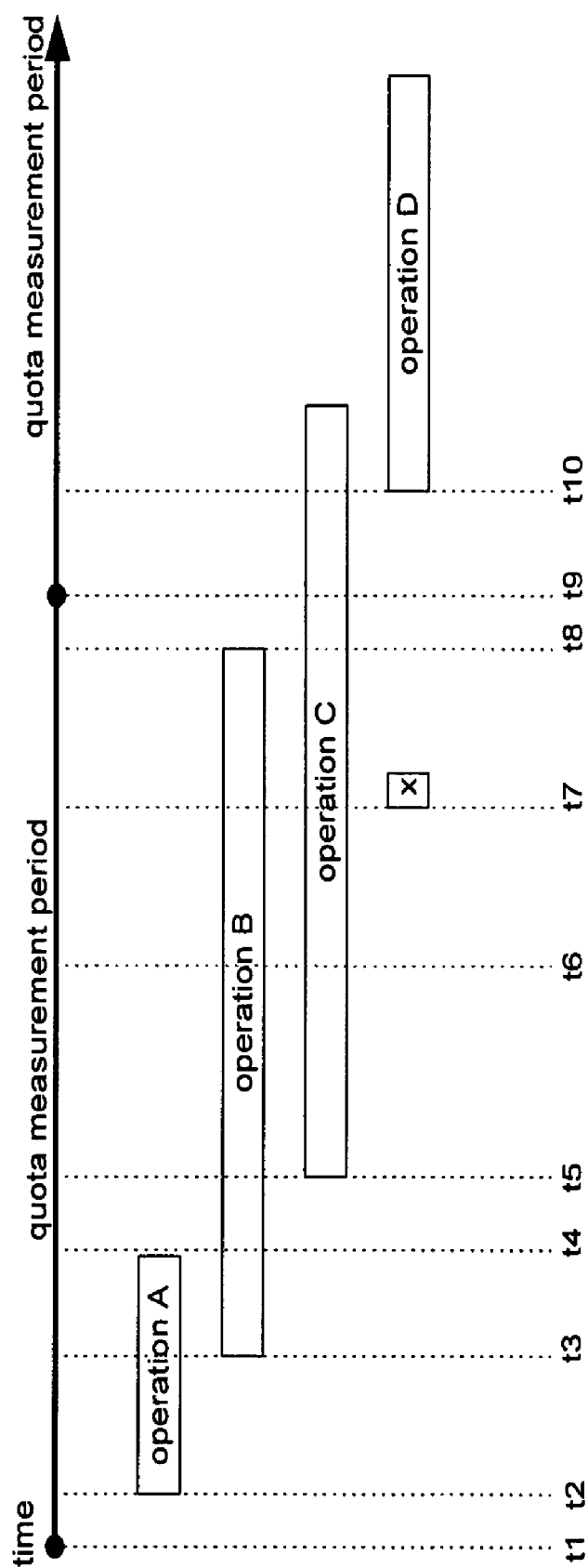
FIG. 4 is a representation showing an example of the maintenance of a cost account according to one embodiment of the present invention.

FIG. 4 is a representation showing an example of the maintenance of a cost account according to one embodiment of the present invention. The various time designations and what each designation represents are as follows:

| Moment in Time | Event |
| --- | --- |
| t1 | Quota measurement period begins. Energy cost account set to zero. |
| t2 | New operation notification received for operation A. Energy cost account updated; operation A registered; watchdog timer started; operation A allowed. |
| t3 | New operation notification received for operation B. Watchdog timer cancelled; energy cost account updated; operation B registered; watchdog timer started; operation B allowed. |
| t4 | Operation A completed. Notification received for completion of operation A. Watchdog timer cancelled; energy cost account updated; operation A unregistered; watchdog timer started. |
| t5 | New operation notification received for operation C. Watchdog timer cancelled; energy cost account updated; operation C registered; watchdog timer started; operation C allowed. |
| t6 | Watchdog timer fires, account updated-energy cost account exceeds quota, but no action is taken yet; watchdog timer started. |
| t7 | New operation notification received for operation D. Watchdog timer cancelled; energy cost account updated; because energy cost account exceeds quota, watchdog timer started, operation D denied. |
| t8 | Operation completed notification received for operation B. Watchdog timer cancelled, account updated, operation B unregistered, watchdog timer started |
| t9 | Quota measurement period restarts, energy cost account set to zero. |
| t10 | New operation notification received for operation D. Watchdog timer cancelled, energy cost account updated; operation D registered; watchdog timer started, operation D allowed. |

In order to implement the system of the present invention, the ERM must receive notifications regarding the beginning and the end of each operation. In an example for Java-based platforms, if the operation comprises a communication session over Bluetooth, then the Java API controlling the Bluetooth device must notify the ERM upon the start of the connection and, if the connection was made, upon the termination of the connection.

Additionally, the ERM of the present invention may also require lower level (e.g., Virtual Machine or operating system) support for those operations that are characterized as being "implicit." An example for Java-based platforms involves thread scheduling. An application's processor time has an energy price. The energy consumption in this case depends directly upon the amount of time that the application threads have spent running. The "operation start" event in this case is the thread being scheduled, while the "operation completed" event is the application thread being de-scheduled. In the event where the Virtual Machine implementation works with green threads, the Virtual Machine must be capable of supporting the ERM. In the event that the Virtual Machine applies native threads, operating system support is needed.

The system of the present invention described herein comprises a standalone system, concentrating on controlling energy usage. However, a device implementing the present invention may also contain a more complex resource management system which controls various other resources. These other resources can include, but are not limited to, primary and secondary storage usage, processor time, etc. In these cases, some of the operations that are energy-intensive may be monitored from other points of view. For example, in the case of network communication, the available network bandwidth is an important resource to control, as are the energy costs of the network communication. For these cases, a single monitoring system can be used to decrease the monitoring overhead. For example, in the case of network communication, energy costs could be reduced simply by examining the network bandwidth usage.

The present invention is described in the general context of method steps, which may be implemented in one embodiment by a program product including computer-executable instructions, such as program code, executed by computers in networked environments.

Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule-based logic and other logic to accomplish the various database searching steps, correlation steps, comparison steps and decision steps. It should also be noted that the words "component" and "module" as used herein, and in the claims, are intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method for controlling resource usage in an electronic device, comprising:
   maintaining an energy cost account for a software entity to reflect a calculated energy cost of performed operations for the software entity over a quota measurement period;
   monitoring whether the energy cost account exceeds a cost quota; and
   taking a corrective action against the software entity if the software entity has exceeded the cost quota.

2. The method of claim 1, further comprising:
   receiving a start event indicating the start of a new energy-intensive operation for a particular software entity on the electronic device;
   canceling the operation of a watchdog timer;
   if the particular software entity has no previously-created energy cost account, creating an energy cost account for the particular software entity;
   updating the energy cost account to reflect a calculated energy cost for previously registered operations for the particular software entity;
   determining whether the particular software entity has exceeded its cost quota by comparing the energy cost account to the cost quota;
   if the particular software entity has exceeded its cost quota, initiating corrective action against the particular software;
   if no correction action was initiated or if the initiated corrected action permitted the new operation to proceed;
   registering the new operation; and
   restarting the operation of the watchdog timer.

3. The method of claim 1, further comprising:
   receiving a termination event indicating the termination of an operation on the electronic device; canceling the operation of a watchdog timer;
   updating the energy cost account to reflect a calculated energy cost for active operations for the software entity;
   determining whether the software entity has exceeded its cost quota by comparing the energy cost account and the cost quota;
   if the software entity has indeed exceeded its cost quota, initiating corrective action against the software entity;
   unregistering the operation; and restarting the operation of the watchdog timer.

4. The method of claim 1, further comprising:
   receiving a watchdog timer expired event indicating the termination of operation of a watchdog timer;
   updating the energy cost account to reflect a calculated energy cost for active operations for the software entity;
   determining whether the software entity has exceeded its cost quota by comparing the energy cost account and the cost quota;
   if the software entity has exceeded its cost quota, initiating corrective action against the software entity; and
   restarting the operation of the watchdog timer.

5. The method of claim 1, further comprising:
   automatically reinitiating new quota measurement period when the previous quota measurement period has expired; and
   resetting the software entity's energy cost account when reinitiating new quota measurement period.

6. The method of claim 1, wherein those operations of the software entity that have been registered and running since the initiation of the most recent quota measurement period are calculated into energy cost account.

7. The method of claim 1, further comprising enabling a user to adjust duration of the quota measurement period.

8. The method of claim 1, wherein the amount of the cost quota for the software entity is determined using a policy system.

9. The method of claim 8, wherein the size of the cost quota for the software entity is different than a cost quota for at least one other software entity.

10. The method of claim 9, further comprising enabling a user to adjust a value of the cost quota.

11. The method of claim 1, wherein corrective action against the software entity that has exceeded the cost quota is determined using a policy system.

12. The method of claim 11, further comprising enabling a user to set a corrective action against software entity that has been exceeded its cost quota.

13. A computer program product, embodied in a computer-readable storage medium, for controlling resource usage in an electronic device when executed, comprising:
   computer code for maintaining an energy cost account for a software entity to reflect a calculated energy cost of performed operations for the software entity over a quota measurement period;
   computer code for monitoring whether the energy cost account exceeds a cost quota; and
   computer code for taking a corrective action against the software entity if the software entity has exceeded the cost quota.

14. The computer program product of claim 13, further comprising:
   computer code for receiving a start event indicating the start of a new energy-intensive operation for a particular software entity on the electronic device;
   computer code for canceling the operation of a watchdog timer;
   computer code for, if the particular software entity has no previously-created energy cost account, creating an energy cost account for the particular software entity;

computer code for updating the energy cost account to reflect a calculated energy cost for previously registered operations for the particular software entity;

computer code for determining whether the particular software entity has exceeded its cost quota by comparing the energy cost account to the cost quota;

computer code for, if the particular software entity has exceeded its cost quota, initiating corrective action against the particular software;

computer code for, if no correction action was initiated or if the initiated corrected action permitted the new operation to proceed; registering the new operation; and computer code for restarting the operation of the watchdog timer.

15. The computer program product of claim 13, further comprising:

computer code for receiving a termination event indicating the termination of an operation on the electronic device;

computer code for canceling the operation of a watchdog timer;

computer code for updating the energy cost account to reflect a calculated energy cost for active operations for the software entity;

computer code for determining whether the software entity has exceeded its cost quota by comparing the energy cost account and the cost quota;

computer code for, if the software entity has indeed exceeded its cost quota, initiating corrective action against the software entity;

computer code for unregistering the operation; and computer code for restarting the operation of the watchdog timer.

16. The computer program product of claim 13, further comprising:

computer code for receiving a watchdog timer expired event indicating the termination of operation of a watchdog timer;

computer code for updating the energy cost account to reflect a calculated energy cost for active operations for the software entity;

computer code for determining whether the software entity has exceeded its cost quota by comparing the energy cost account and the cost quota;

computer code for, if the software entity has exceeded its cost quota, initiating corrective action against the software entity; and computer code for restarting the operation of the watchdog timer.

17. The computer program product of claim 13, further comprising:

computer code for automatically reinitiating new quota measurement period when the previous quota measurement period has expired;

computer code for resetting the software entity's energy cost account when reinitiating new quota measurement period; and computer code for enabling a user to adjust the duration of the quota measurement period.

18. The computer program product of claim 13, wherein the amount of the cost quota for the software entity is determined using a policy system, and wherein the size of the cost quota for the software entity is different than a cost quota for at least one other software entity.

19. The computer program product of claim 13, wherein corrective action against the software entity that has exceeded the cost quota is determined using a policy system, and further comprising computer code for enabling a user to set a corrective action against software entity that has been exceeded its cost quota.

20. An electronic device, comprising:

a processor; and a memory unit operatively connected to the processor and including:

computer code for maintaining an energy cost account for a software entity to reflect a calculated energy cost of performed operations for the software entity over a quota measurement period;

computer code for monitoring whether the energy cost account exceeds a cost quota;

and computer code for taking a corrective action against the software entity if the software entity has exceeded the cost quota.

21. The electronic device of claim 20, wherein the memory unit further comprises:

computer code for receiving a start event indicating the start of a new energy-intensive operation for a particular software entity on the electronic device;

computer code for canceling the operation of a watchdog timer;

computer code for, if the particular software entity has no previously-created energy cost account, creating an energy cost account for the particular software entity;

computer code for updating the energy cost account to reflect a calculated energy cost for previously registered operations for the particular software entity;

computer code for determining whether the particular software entity has exceeded its cost quota by comparing the energy cost account to the cost quota;

computer code for, if the particular software entity has exceeded its cost quota, initiating corrective action against the particular software;

computer code for, if no correction action was initiated or if the initiated corrected action permitted the new operation to proceed; registering the new operation; and computer code for restarting the operation of the watchdog timer.

22. The electronic device of claim 20, wherein the memory unit further comprises:

computer code for receiving a termination event indicating the termination of an operation on the electronic device;

computer code for canceling the operation of a watchdog timer; computer code for updating the energy cost account to reflect a calculated energy cost for active operations for the software entity;

computer code for determining whether the software entity has exceeded its cost quota by comparing the energy cost account and the cost quota;

computer code for, if the software entity has indeed exceeded its cost quota, initiating corrective action against the software entity; computer code for unregistering the operation; and computer code for restarting the operation of the watchdog timer.

23. The electronic device of claim 20, wherein the memory unit further comprises:

computer code for receiving a watchdog timer expired event indicating the termination of operation of a watchdog timer;

computer code for updating the energy cost account to reflect a calculated energy cost for active operations for the software entity;

computer code for determining whether the software entity has exceeded its cost quota by comparing the energy cost account and the cost quota;

computer code for, if the software entity has exceeded its cost quota, initiating corrective action against the software entity; and computer code for restarting the operation of the watchdog timer.

24. The electronic device of claim 20, wherein the memory unit further comprises:

computer code for automatically reinitiating a new quota measurement period when the previous quota measurement period has expired;

computer code for resetting the software entity's energy cost account when reinitiating new quota measurement period; and computer code for enabling a user to adjust duration of the quota measurement period.

25. The electronic device of claim 20, wherein the amount of the cost quota for the software entity is determined using a policy system, and wherein the size of the cost quota for the software entity is different than a cost quota for at least one other software entity.

26. The electronic device of claim 20, wherein corrective action against the software entity that has exceeded the cost quota is determined using a policy system, and further comprising computer code for enabling a user to set a corrective action against software entity that has been exceeded its cost quota.

* * * * *